(12) United States Patent
Qin et al.

(10) Patent No.: US 9,178,395 B2
(45) Date of Patent: Nov. 3, 2015

(54) TRACTION MOTOR FOR ELECTRIC VEHICLES

(75) Inventors: Rui Feng Qin, Hong Kong (CN); Chang Jin Zhou, Shenzhen (CN); Ling Yang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 469 days.

(21) Appl. No.: 12/884,948

(22) Filed: Sep. 17, 2010

(65) Prior Publication Data

US 2011/0068652 A1    Mar. 24, 2011

(30) Foreign Application Priority Data

Sep. 18, 2009   (CN) .......................... 2009 1 0190476

(51) Int. Cl.
    *H02K 3/28*    (2006.01)
    *H02K 1/27*    (2006.01)
    *H02K 29/03*   (2006.01)

(52) U.S. Cl.
    CPC ............... *H02K 3/28* (2013.01); *H02K 1/2766* (2013.01); *H02K 29/03* (2013.01); *Y02T 10/641* (2013.01)

(58) Field of Classification Search
    USPC .................... 310/179, 180, 208, 181, 156.53, 310/156.56, 184
    See application file for complete search history.

(56) References Cited

U.S. PATENT DOCUMENTS

| | | | |
|---|---|---|---|
| 4,144,470 A * | 3/1979 | Auinger .......................... | 310/198 |
| 4,609,862 A * | 9/1986 | Becker et al. .................... | 322/90 |
| 5,231,324 A * | 7/1993 | Kawamura et al. ............. | 310/198 |
| 5,783,891 A * | 7/1998 | Auinger et al. ................ | 310/180 |
| 5,925,999 A * | 7/1999 | Lakerdas et al. .............. | 318/496 |
| 6,597,077 B2 * | 7/2003 | Lin et al. ...................... | 310/49.37 |
| 6,684,483 B2 * | 2/2004 | Rahman et al. ................ | 29/596 |
| 6,853,107 B2 * | 2/2005 | Pyntikov et al. .............. | 310/184 |
| 7,126,247 B2 * | 10/2006 | Yoneda et al. ................ | 310/208 |
| 8,174,159 B2 * | 5/2012 | Xu et al. ........................ | 310/198 |
| 2002/0030416 A1 * | 3/2002 | Jinupun .......................... | 310/166 |
| 2004/0251763 A1 * | 12/2004 | Tamaki et al. ............. | 310/156.53 |
| 2005/0017589 A1 * | 1/2005 | Ionel et al. ................ | 310/156.47 |
| 2005/0200223 A1 * | 9/2005 | Tajima et al. ............. | 310/156.46 |
| 2007/0126307 A1 * | 6/2007 | Fei ................................. | 310/184 |
| 2008/0103632 A1 * | 5/2008 | Saban et al. .................. | 700/286 |
| 2008/0174196 A1 * | 7/2008 | Hattori ........................ | 310/180 |
| 2011/0074243 A1 * | 3/2011 | Liang et al. ............. | 310/216.112 |

FOREIGN PATENT DOCUMENTS

| JP | S5953050 A | 3/1984 |
|---|---|---|
| JP | 2004260972 A | 9/2004 |

(Continued)

OTHER PUBLICATIONS

Hrabovcová, Valeria et al., "Influence of Axially Laminated Rotor Arrangement on the Saliency Ratio of the 4-Pole Reluctance Synchronous Motor", Worshop on Electrical Machines' Parameters, Technical University of Cluj-Napoca, May 26, 2001, pp. 1-8.

*Primary Examiner* — Naishadh Desai
(74) *Attorney, Agent, or Firm* — Muncy, Geissler, Olds & Lowe, P.C.

(57) ABSTRACT

A traction motor for an electric vehicle, comprises a stator and a rotor rotatably mounted to the stator. The rotor comprises a rotor core and magnets fixed to the rotor core. The rotor core has 2P rotor poles formed by the magnets, P being an integer greater than one. The stator comprises a stator core having S teeth and field windings wound on the teeth, S being equal to $3 \cdot m \cdot P$ where m is the number of phases. Field windings of each phase comprises P winding units. Each the winding unit comprises a first coil and a second coil connected in series. The first coils have a larger coil pitch and a greater number of turns compared to the second coils.

19 Claims, 8 Drawing Sheets

(56) References Cited

FOREIGN PATENT DOCUMENTS

| JP | 2005051979 | A1 | 2/2005 |
| JP | 2005130627 | A | 5/2005 |
| JP | 2006074989 | A | 3/2006 |
| JP | 2007330035 | A1 | 12/2007 |
| JP | 2008312318 | A | 12/2008 |

* cited by examiner

TRACTION MOTOR FOR ELECTRIC VEHICLES

CROSS REFERENCE TO RELATED APPLICATIONS

This non-provisional patent application claims priority under 35 U.S.C. §119(a) from Patent Application No. 200910190476.5 filed in The People's Republic of China on Sep. 18, 2009.

FIELD OF THE INVENTION

This invention relates to an electric motor and in particular to a traction motor for an electric vehicle. An electric vehicle (EV), also referred to as an electric drive vehicle, is a vehicle which uses one or more electric motors for propulsion. Electric vehicles can include electric cars, hybrid electric cars, electric trains, electric boats, electric bikes, etc.

BACKGROUND OF THE INVENTION

Synchronous motors are widely used as traction motors for electric vehicles. Electric energy is converted into mechanical energy by the traction motor to drive the vehicle. In an hybrid electric vehicle, other types of energy can be converted into electric energy for use by the traction motor. However, traditional traction motors are noisy and have a low efficiency. Therefore, there is a desire for an improved traction motor.

SUMMARY OF THE INVENTION

Accordingly, in one aspect thereof, the present invention provides a traction motor for an electric vehicle, comprising a stator and a rotor rotatably mounted to the stator, wherein the rotor comprises a rotor core and magnets fixed to the rotor core, the rotor core having 2P rotor poles formed by the magnets, P being an integer larger than one, wherein the stator comprises a stator core having S teeth and field windings wound on the teeth, S being equal to 3·m·P and m is the number of phases; and wherein field windings of each phase comprises P winding units, each of the winding units comprising a first coil and a second coil connected in series, the first coils having a larger coil pitch and a greater number of turns compared with the second coils.

Preferably, for each winding unit, the center of the first coil overlaps with the center of the second coil in a radial direction of the stator.

Preferably, for each winding unit, the number of turns of the first coil is twice the number of turns of the second coil.

Preferably, for each winding unit, the coil pitch of the first coil is larger than the coil pitch of the second coil by two teeth.

Preferably, P=4, S=36 and m=3.

Preferably, each phase comprises four winding units, and the four winding units are electrically connected as: one series branch; or two parallel branches, each branch comprising two winding units connected in series; or four parallel branches, each branch comprising one winding unit.

Preferably, the magnets are inserted into the rotor core in an axial direction.

Preferably, there is an air gap between the stator and the rotor core, and the radial thickness of the air gap at portions corresponding to the center of two adjoining rotor poles is larger than the radial thickness of the air gap at portions corresponding to the center of each rotor pole.

Preferably, each of the rotor poles is formed by: one piece of magnet, which is substantially bisected by a radius of the rotor core; or two pieces of magnets, which form a "V" in a cross section of the rotor core, and the "V" is substantially bisected by a radius of the rotor core; or three pieces of magnets, which form a "U" in a cross section of the rotor core, and the "U" is substantially bisected by a radius of the rotor core; or three pieces of magnets, which form a triangle in a cross section of the rotor core, and the triangle is substantially bisected by a radius of the rotor core; or four pieces of the magnets, which form a "W" in a cross section of the rotor, and the "W" is bisected by a radius of the rotor core.

Preferably, the radius bisecting the arrangement of the magnets of a rotor pole corresponds to the center of that rotor pole.

Preferably, each of the rotor poles is formed by more than one piece of magnet, the pieces of magnet being separated by a bridge portion integrally formed with the rotor core.

Preferably, a plurality of axially extending holes are formed in the rotor core, the holes being arranged around the center of the rotor core.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

A synchronous motor according to the preferred embodiment of the present invention is illustrated in FIGS. 1 to 4. The synchronous motor has a permanent magnet rotor and a three phase wound stator. The synchronous motor is preferably used in the traction system of an electric vehicle, to convert electrical energy into mechanical energy as a traction motor, or convert mechanical energy into electrical energy as a generator.

Figure 1:
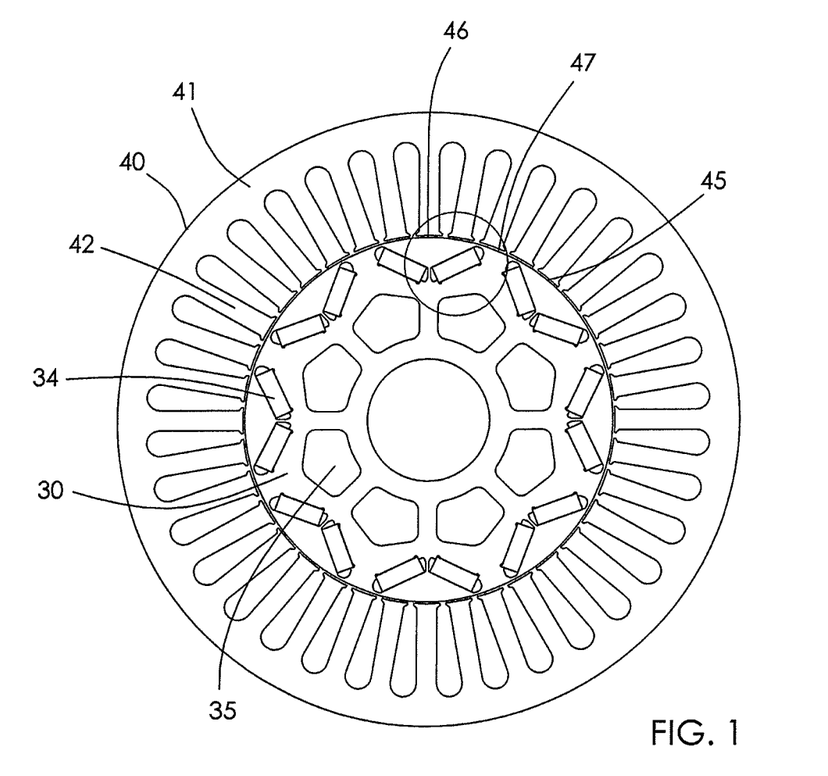
FIG. 1 illustrates a stator core and rotor core of a synchronous motor according to the preferred embodiment of the present invention.
Figure 2:
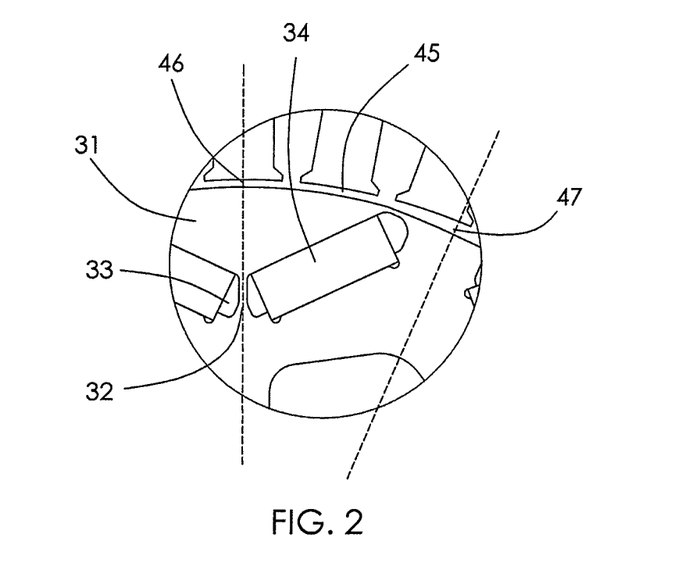
FIG. 2 is a partial enlargement of FIG. 1.

The motor comprises a stator and a rotor rotatably mounted to the stator. FIGS. 1 and 2 show the stator core and the rotor core. The rotor comprises a shaft (not shown), a rotor core 30 fixed to the shaft, and a plurality of magnets 34 fixed to the rotor core 30. Eight rotor poles are formed by the magnets and each rotor pole is formed by a pair of magnets 34. In this specification, including the appended claims, P is used to represent the number of rotor pole pairs. In this embodiment 2P is equal to 8, thus P is equal to 4.

The magnets 34 are disposed within corresponding mounting holes 33 in the rotor core. The magnets are inserted into the mounting holes an axial direction of the rotor. There are sixteen pieces of magnets 34, and each pair of the magnets 34 forms one rotor pole. Each pair of the magnets 34 forms a "V" in a cross section of the rotor, The "V" is substantially bisected by a radius of the rotor. The radius is preferably the radius corresponding to the center of the rotor pole. As more clearly shown in FIG. 2, the two magnets 34 forming one rotor pole are separated by a bridge portion 32 which is integrally formed with the rotor core 30. The opening of the V faces the stator core 40. The bridge portion 32 prevents the two magnets 34 crashing into each other. The bridge portion 32 extends radially and connects the core portion 31 within the V to prevent the core portion 31 from deforming due to centrifugal force.

Furthermore, a plurality of axially extending holes 35 are formed in the rotor core 30. The holes 35 are spaced from each other and arranged around the center of the rotor core 30. The holes 35 reduce the weight of the rotor core 30. The holes 35 also improve the heat dissipation of the rotor.

Figure 3:
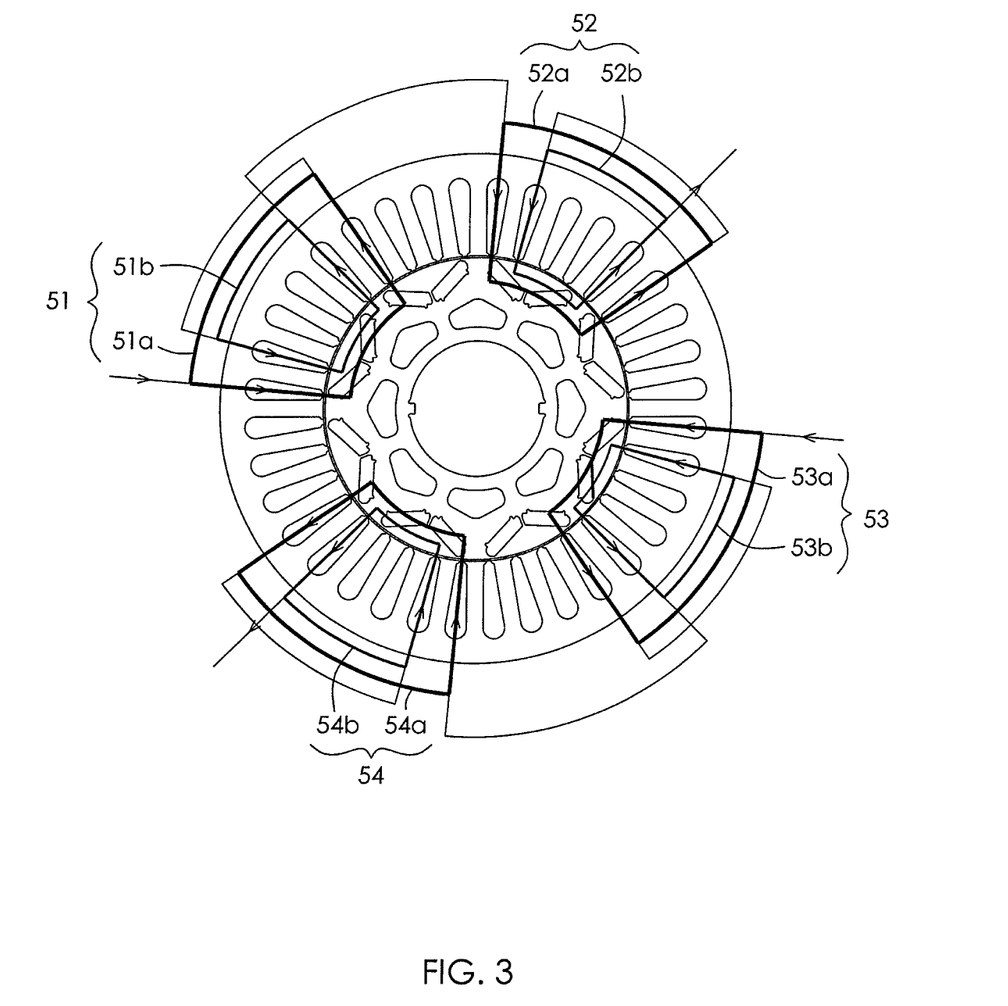
FIG. 3 illustrates fielding windings of one phase of the synchronous motor.

The stator comprises a stator core 40 and field windings (refer to FIG. 3 which shows field windings of one phase only). The stator core 40 comprises a yoke 41 and a plurality of teeth 42 extending inwardly from the yoke 41. The field windings are wound about the teeth 42. There is an air gap 45 between the stator core 40 and the rotor core 30 so that the rotor can rotate within the stator. In this embodiment, the radial thickness of the air gap at portions 46 corresponding to the center of each rotor pole is smaller than the radial thickness of the air gap at portions 47 corresponding to the center or circumferential mid-point between adjacent rotor poles. Preferably, the pole surface of the teeth 42 of the stator core 40 are substantially contained in the circumferential surface of a cylinder and the rotor core 30 has a larger radius at the center of the rotor poles (portions 46) than at the mid-point between the rotor poles (portions 47). Cogging torque and back electromotive force (back EMF) is improved by using the variable thickness air gap, which will be described in detail hereafter.

The stator core 40 comprises thirty six teeth 42 and thirty six winding slots, each of which is formed by two adjoining teeth 42. In this specification including the appended claims, S is used to represent the number of stator teeth (which is equal to the number of winding slots) and m represents the number of phases. S satisfies the equation: $S = 3 \cdot m \cdot P$, wherein P is an integer greater than one and represents the number of rotor pole pairs and m represents the number of phases. In this embodiment, P is 4 and m is 3.

Field windings of one phase are illustrated in FIG. 3. For this phase, the field windings comprise P windings units 51~54. The P winding units are arranged along a circumferential direction of the stator core 40 and do not overlap with each other. Each winding unit comprises a first coil and a second coil. The coil pitch of the first coils is larger than the coil pitch of the of the second coils. For example, winding unit 51 comprises a first coil 51a and a second coil 51b connected in series. The coil pitch of the first coil 51a measured in winding slots or teeth is 5 and the coil pitch of the second coil 51b is 3. That is, the coil pitch of the first coil 51a is larger than the coil pitch of the second coil 51b by two teeth. The center of the first coil 51a overlaps with the center of the second coil 51b at least in a radial direction of the stator. In other words, the center of the first coil 51a and the center of the second coil are located at the same tooth or the same winding slot. The other winding units 52, 53 and 54 are similar to winding unit 51.

For each winding unit, the first coil has a greater number of turns than the second coil. Preferably, the number of turns of the first coil is twice the number of turns of the second coil. In this embodiment, the motor comprises three phases and each phase comprises four winding units and the four winding units are electrically connected as two parallel branches, each of the parallel branches comprising two winding units connected in series. For example, winding units 51 and 22 are connected in series as one of the parallel branches and winding units 53 and 54 are connected in series as the other parallel branch. Alternatively, for each phase, the four winding units can be electrically connected as one series branch, or four parallel branches.

Figure 4:
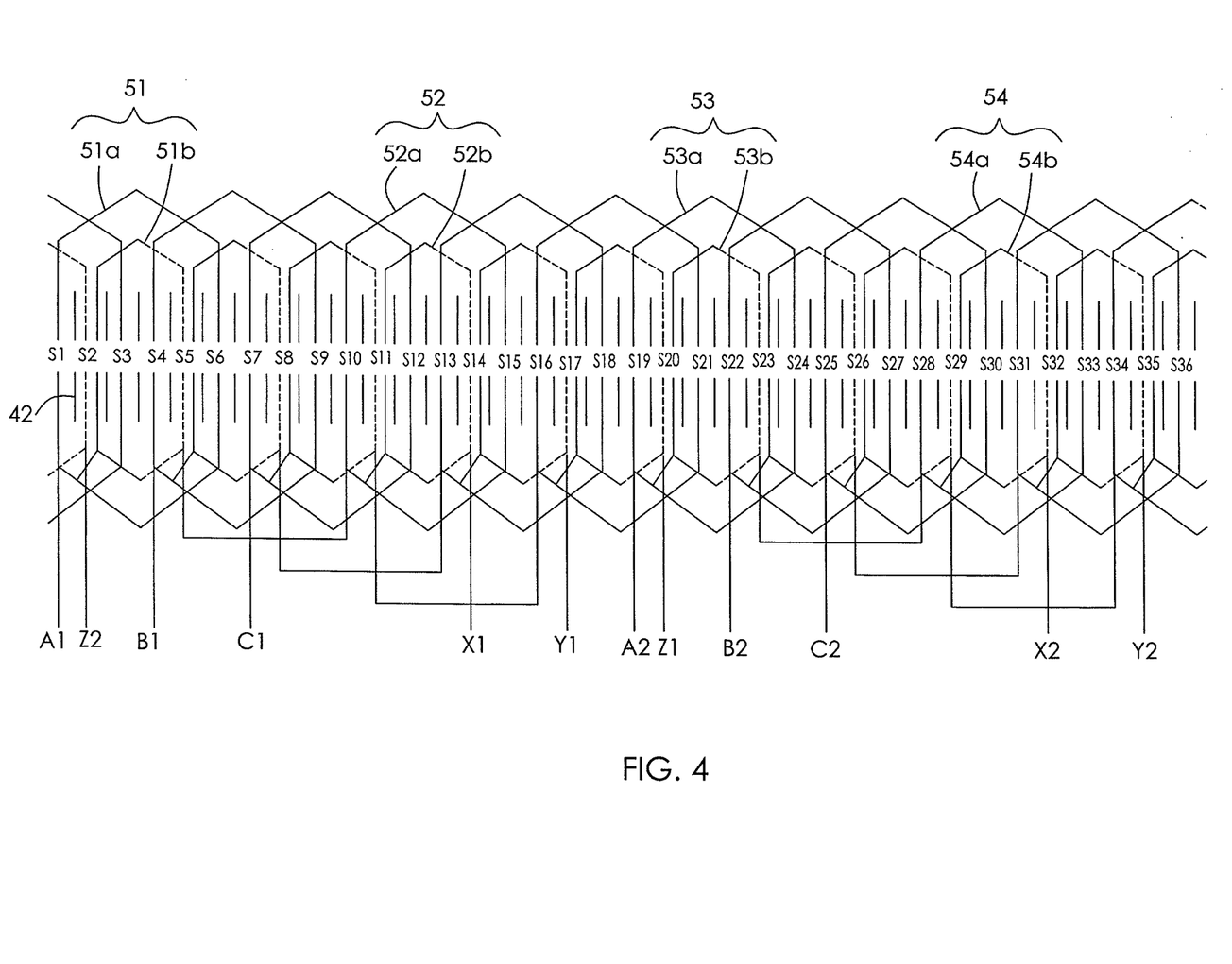
FIG. 4 illustrates all fielding windings of the synchronous motor.

FIG. 4 illustrates the entire field windings of the stator. In FIG. 4, the vertical lines represent teeth 42, and the thirty six winding slots are represented as S1-S36 respectively. The field windings are divided into three phases and each phase comprises P winding units (P=4 in this embodiment).

More specifically, the first phase comprises four winding units 51~54, each winding unit comprising a first coil having larger coil pitch and a second coil having a smaller coil pitch. For each winding unit, the center of the first coil is aligned with the center of the second coil, so that the first coil and the second coil are called concentric windings. Winding unit 51 and 52 are electrically connected in series, and the two winding units 51 and 52 have two terminals A1 and X2. Similarly, winding units 53 and 54 are electrically connected in series and the two winding units 53 and 54 have two terminals A2 and X2. Terminals A1 and A2 are connected together and terminals X1 and X2 are connected together to form two parallel branches.

Similarly, the second phase comprises another four winding units. The four winding units are electrically connected as two parallel branches, one of the parallel branches having terminals B1 and Y1 and the other parallel branch having terminals B2 and Y2, wherein terminals B1 and B2 are connected together and terminals Y1 and Y2 are connected together.

The third phase comprises another four winding units and the four winding units are connected as two parallel branches. One of the branches has terminals C1 and Z1, and the other branch has terminals C2 and Z2, wherein terminals C1 and C2 are connected together and terminals Z1 and Z2 are connected together.

In this embodiment, terminals X1 and X2, Y1 and Y2, Z1 and Z2 are connected together as a star point or neutral point. This is known as a star connection. Alternatively, the three phases can be connected in a delta configuration.

As shown in FIG. 4, of the thirteen-six winding slots S1~S36, some winding slots only receive the first coils of the winding units, one coil for each winding slot, while the other winding slots receive the second coils of the winding units, two coils for each winding slot and the two second coils belong to different phases. More specifically, a first set of winding slots S1, S3, S4, S6, S7, S9, S10, S12, S13, S15, S16, S18, S19, S21, S22, S24, S25, S27, S28, S30, S31, S33, S34 and S36 only receive the first coils and each winding slot only receives one of the first coils. A second set of winding slots S2, S5, S8, S11, S14, S17, S20, S23, S26, S29, S32 and S35 receive the second coils and each winding slot receives two of the second coils that are not in the same phase. Preferably, insulating members are disposed in the second set of winding slots to separate the two second coils.

Figure 5:
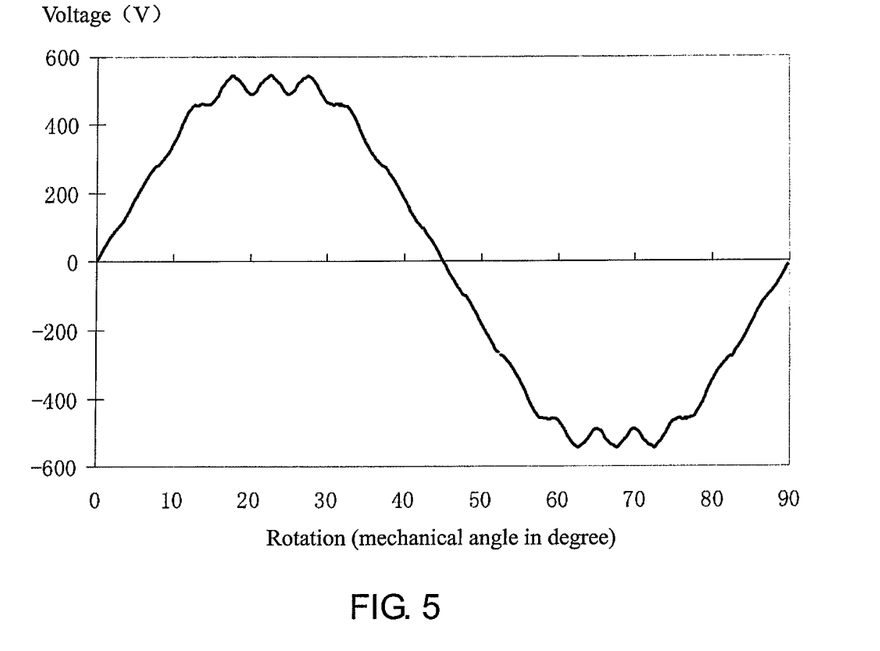
FIG. 5 is a graph of back electromotive force (back EMF) of the synchronous motor.

FIG. 5 is a graph illustrating the back EMF of the motor. The back EMF is represented by a curve in FIG. 5 and the curve is similar to a sine curve. As is known in the art, if the back EMF curve is closer to a sine curve, the noise and harmonics are lower. That is, the synchronous motor according to preferred embodiments of the present invention has low noise and harmonics.

Figure 6:
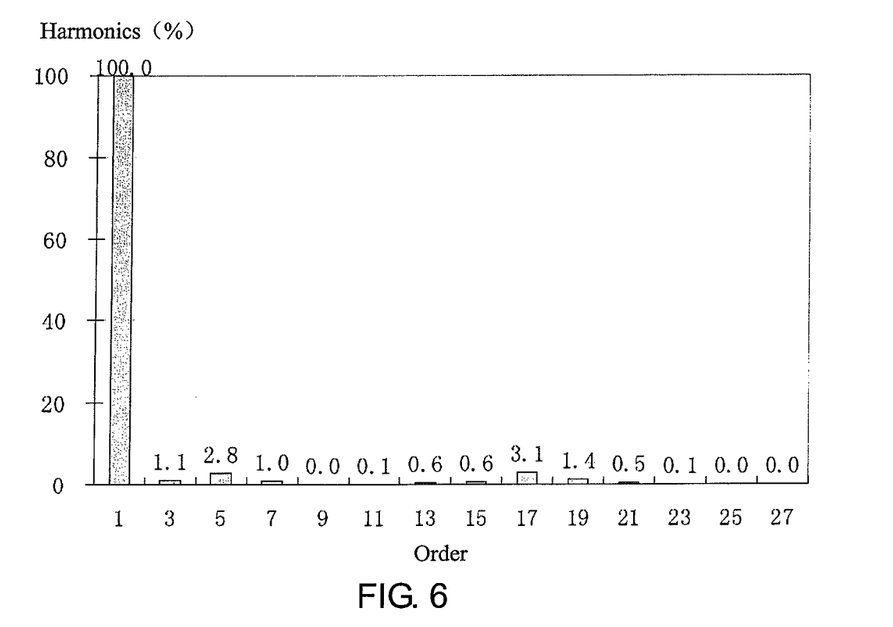
FIG. 6 is a graph of harmonics of the synchronous motor.

FIG. 6 illustrates the distribution of the harmonics. As is shown in FIG. 6, except the harmonic component of the first order (corresponding to fundamental frequency), the harmonic components of the other orders are significantly reduced. Further more, harmonic components of some orders such as the 9th order, the 10th order are near to zero. Therefore, vibration and noise is reduced and efficiency is improved.

Figure 7:
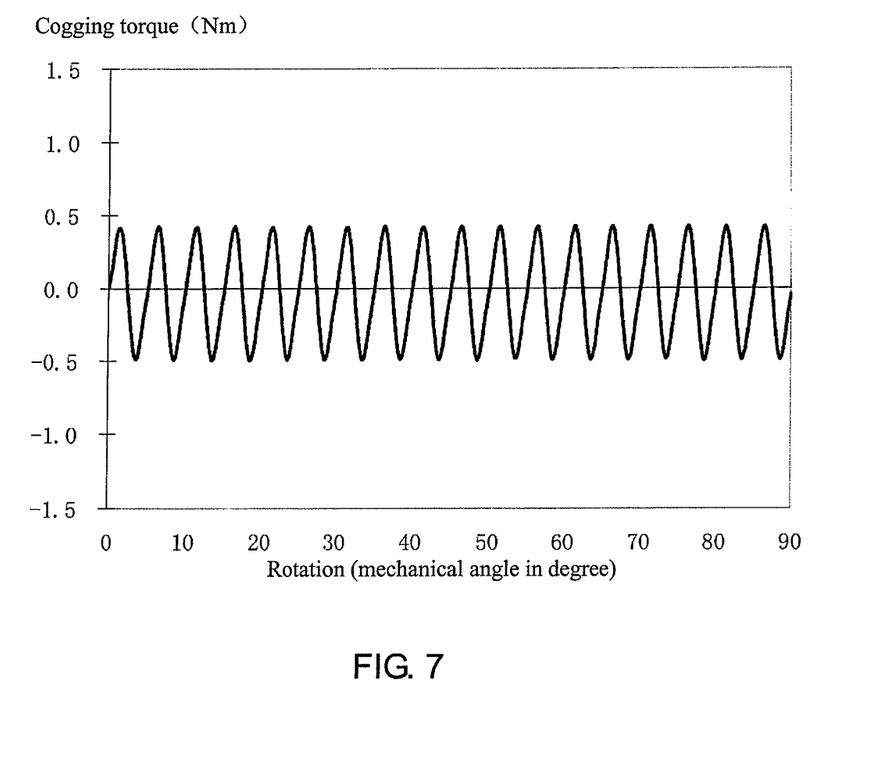
FIG. 7 is a graph of cogging torque of the synchronous motor.

FIG. 7 illustrates the cogging torque of the motor. The motor comprises thirty six teeth 42 and four pairs of rotor poles. When the rotor rotates 90 degrees (mechanical angle), there are eighteen cycles for the cogging torque. In other words, cogging torque cycle is short and frequency is high. Therefore, amplitude is reduced and noise is reduced.

Figure 8:
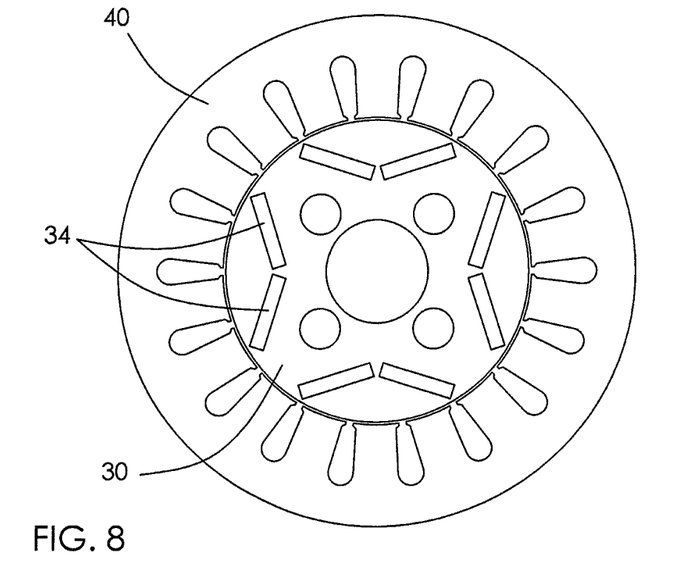
FIG. 8 illustrates a stator core and rotor core of a motor according to another embodiment of the present invention.
Figure 9:
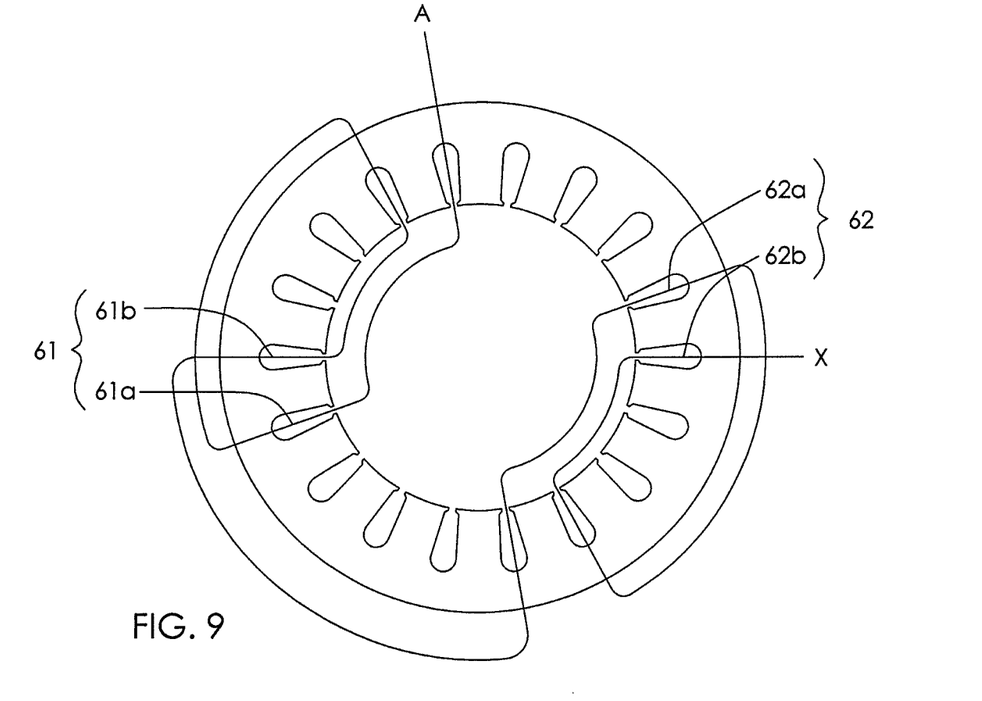
FIG. 9 illustrates field windings of one phase of the motor of FIG. 8.

FIG. 8 illustrates the stator core and the rotor core of a synchronous motor according to a second preferred embodiment of the present invention. The motor is also a three-phase AC motor (m=3). FIG. 9 illustrates one phase of the field windings. The motor comprises a rotor with four poles, each of the poles being formed by a pair of permanent magnets 34. The motor comprises a stator having eighteen winding slots. That is, the number of phases m is 3, and the number of pole pairs P is 2, and the number of winding slots S is 18 which is equal to 3·m·P. In this embodiment, each phase comprises two winding units such as winding units 61 and 62 and each winding unit such as winding unit 61 comprises a first coil 61a and a second coil 61b that are concentric windings and connected in series. Coil pitch of the first coil such as coil 61, measured by the number of stator teeth, is 5 and the coil pitch of the second coil such as coil 61b is 3. For each phase, the two winding units may be connected in series. Alternatively, for each phase, the two winding units can be connected as two parallel branches.

Figure 10:
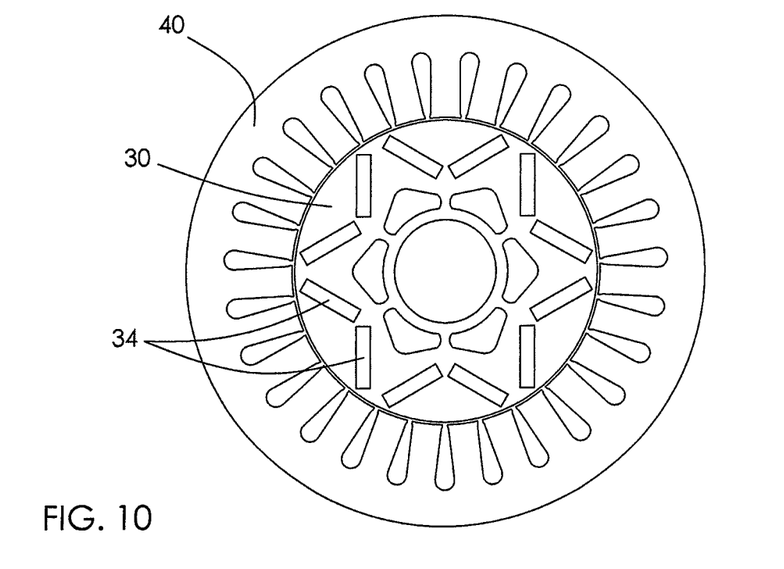
FIG. 10 illustrates a stator core and rotor core of a motor according to a third embodiment of the present invention.
Figure 11:
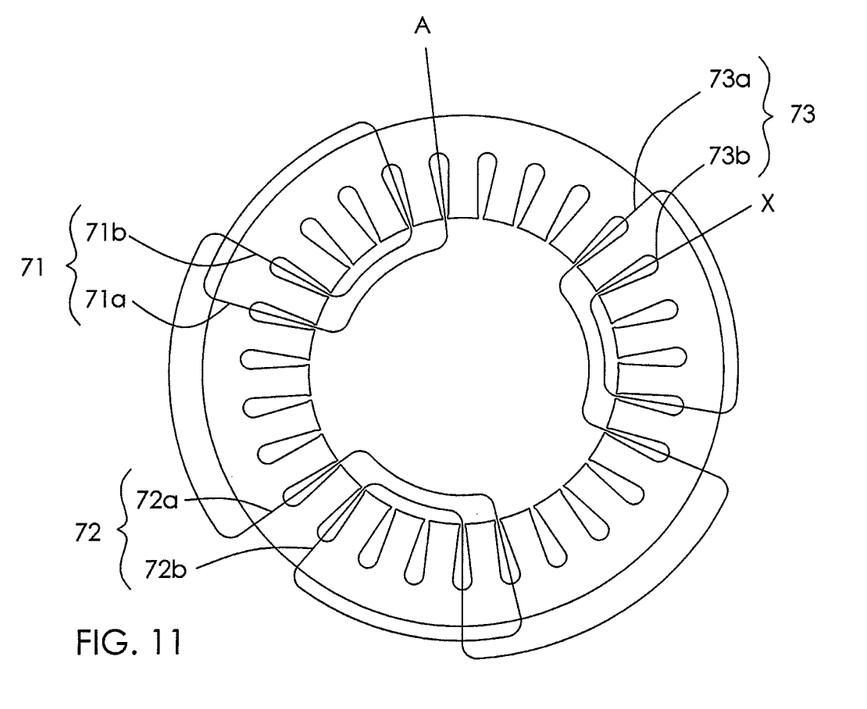
FIG. 11 illustrates fielding windings of one phase of the motor of FIG. 10.

FIG. 10 illustrates another motor according to a third preferred embodiment. The motor is a three-phase motor. FIG. 11 illustrates one phase of its field windings. The motor comprises a stator having twenty seven winding slots and a rotor having six rotor poles (pole pair number P=3). Each of the rotor poles is formed by a pair of permanent magnets 34 inserted into mounting holes in the rotor core 30 in an axial direction. The pair of magnets forms a "V" in a cross section of the rotor. Each phase comprises three winding units and each winding unit such as winding unit 71 comprises a first coil such as 71a and a second coil such as coil 71b that are concentric windings and are connected in series. The coil pitch of the first coil is 5 and coil pitch of the second coil is 3. For each phase, the three winding units such as winding units 71~73 are connected in series. Alternatively, the three winding units can be connected in two parallel branches, one of the branches having two winding units connected in series, and the other one branch having only one winding unit. Further, the winding units of each phase may be connected as parallel branches.

Figure 12:
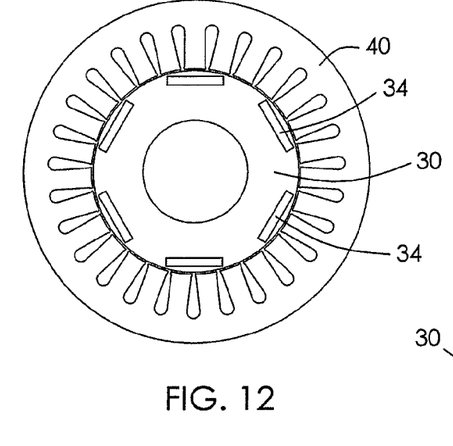
FIG. 12 illustrates a stator core and rotor core of a motor showing an different arrangement of the rotor magnets.

Of the embodiments mentioned above, each rotor pole is formed by a pair of permanent magnets inserted into the rotor core. However, each rotor pole can be formed by only one piece of magnet. Preferably, the one piece of magnet is bisected by one radius of the rotor. Such an arrangement of the rotor poles is illustrated in FIG. 12 which shows a stator core with 27 stator teeth and a rotor core with 6 rotor poles (P=3).

Figure 13:
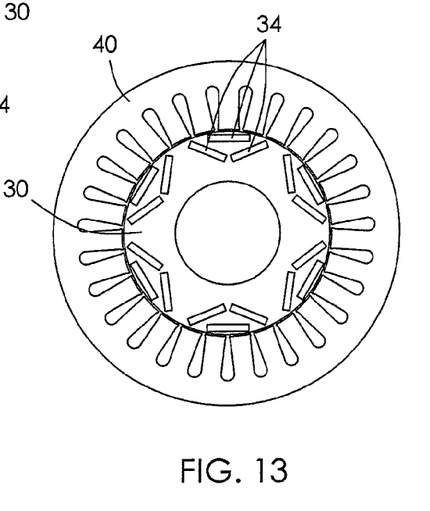
FIG. 13 illustrates a stator core and rotor core of a motor showing an alternative arrangement of the rotor magnets.
Figure 14:
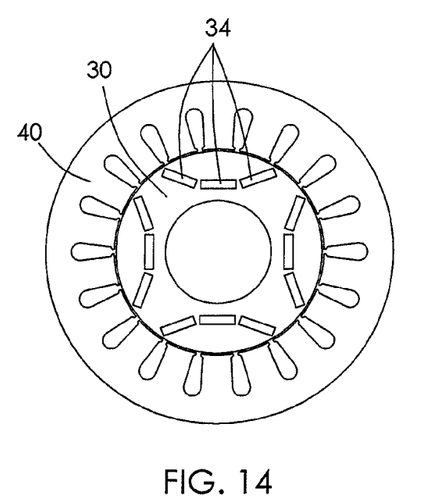
FIG. 14 illustrates a stator core and rotor core of a motor showing another arrangement of the rotor magnets.

Alternatively, each rotor pole can be formed by three pieces of magnet and the three pieces of magnet preferably form a "U" or a triangle in a cross section of the rotor, and the "U" or triangle is bisected by a radius of the rotor. FIG. 13 illustrates a triangular arrangement of the magnets of the rotor poles, with a motor having a stator with 27 stator teeth (S=27) and a rotor with 6 rotor poles (P=3). FIG. 14 illustrates a "U" arrangement of the magnets of the rotor poles, with a motor having a stator with 18 teeth (S=18) and a rotor with 4 rotor poles (P=2).

Figure 15:
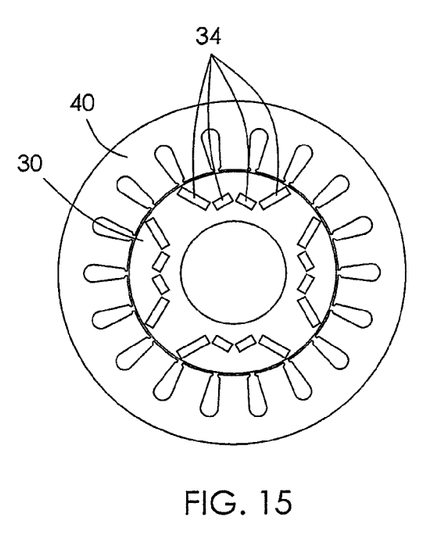
FIG. 15 illustrates a stator core and rotor core of a motor showing a further alternative arrangement of the rotor magnets.

Alternatively, each rotor pole can be formed by four pieces of magnet. Preferably, the four pieces of magnet form a "W" or double "V" in a cross section of the rotor, and the "W" or double "V" is bisected by one radius of the rotor. FIG. 15 illustrates a "W" arrangement of the magnets of the rotor poles, with a motor having a stator with 18 teeth (S=18) and a rotor with 4 rotor poles (P=2).

While the single magnet per rotor pole produces satisfactory results for some applications, the use of more magnets per rotor pole increases the output torque and the efficiency of the motor by increasing the saliency ratio. The saliency ratio is defined as Ld/Lq and Ld is increased by using multiple magnets per rotor pole. However, use of multiple magnets per pole will increase the cost of the motor thus requiring a commercial compromise between cost and performance.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A traction motor for an electric vehicle, comprising a stator and a rotor rotatably mounted to the stator,
   wherein the rotor comprises a rotor core and magnets fixed to the rotor core, the rotor core having 2P rotor poles formed by the magnets, P being an integer larger than one,
   wherein the stator comprises a stator core having a plurality of teeth and a plurality of field windings wound on the teeth, the field windings forming m phases, m being an integer, the number of the teeth of the stator core being equal to 3·m·P,
   wherein the field windings of each phase comprises P winding units arranged in a circumferential direction of the motor in turns, each of the winding units comprising a first coil wound on a first set of teeth, and a second coil wound on a second set of teeth and connected with the first coil in series, the first set of teeth comprising all the second set of teeth and at least one another tooth, the first coil having a larger coil pitch and a greater number of turns compared with the second coil, and the first coil being wound before the second coil.

2. The traction motor of claim 1, wherein, for each winding unit, the center of the first coil overlaps with the center of the second coil in a radial direction of the stator and the first coil spans over all teeth on which the second coil are wound.

3. The traction motor of claim 1, wherein, for each winding unit, the number of turns of the first coil is twice the number of turns of the second coil.

4. The traction motor of claim 1, wherein, for each winding unit, the coil pitch of the first coil is larger than the coil pitch of the second coil by two teeth.

5. The traction motor of claim 1, wherein P=4, S=36 and m=3.

6. The traction motor of claim 1, wherein each phase comprises four winding units, and the four winding units are electrically connected as:
  one series branch; or
  two parallel branches, each branch comprising two winding units connected in series; or
  four parallel branches, each branch comprising one winding unit.

7. The traction motor of claim 1, wherein the magnets are inserted into the rotor core in an axial direction.

8. The traction motor of claim 7, wherein there is an air gap between the stator and the rotor core, and the radial thickness of the air gap at portions corresponding to the center of two adjoining rotor poles is larger than the radial thickness of the air gap at portions corresponding to the center of each rotor pole.

9. The traction motor of claim 1, wherein each of the rotor poles is formed by:
  one piece of magnet, which is substantially bisected by a radius of the rotor core; or
  two pieces of magnet, which form a "V" in a cross section of the rotor core, and the "V" is substantially bisected by a radius of the rotor core; or
  three pieces of magnet, which form a "U" in a cross section of the rotor core, and the "U" is substantially bisected by a radius of the rotor core; or
  three pieces of magnet, which form a triangle in a cross section of the rotor core, and the triangle is substantially bisected by a radius of the rotor core; or
  four pieces of the magnet, which form a "W" in a cross section of the rotor, and the "W" is bisected by a radius of the rotor core.

10. The traction motor of claim 1, wherein each of the rotor poles is formed by more than one piece of magnet, the pieces of magnet being separated by a bridge portion integrally formed with the rotor core.

11. The traction motor of claim 1, wherein a plurality of axially extending holes are formed in the rotor core, the holes being arranged around the center of the rotor core.

12. The traction motor of claim 1, wherein said P winding units of each phase are spaced from each other in the circumferential direction.

13. A traction motor for an electric vehicle, comprising:
  a stator comprising a stator core having a plurality of teeth and field windings wound on the teeth, the field windings forming m phases, m being an integer, the field windings of each phase comprises P winding units, P being an integer larger than one, each of the winding units comprising a first coil and a second coil connected in series, the first coil having a first circumferential span, the second coil having a second circumferential span located within the first circumferential span, the first coil having a larger coil pitch compared with the second coil, wherein each winding unit having an input end for electricity flowing into the winding unit and an output end for electricity flowing out of the winding unit, the input end is formed as a start of the first coil, and the output end is formed as an end of the second coil, the output end is continuously connected with an input end of another winding unit; and
  a rotor rotatably mounted to the stator and comprising a rotor core and a plurality of magnets fixed to the rotor core, the plurality of magnets forming 2P rotor poles,
  wherein the number of the teeth of the stator core is equal to 3·m·P and the number of the winding units of each phase is half of that of the rotor poles.

14. The traction motor of claim 13, wherein for each phase, the winding units are spaced from each other in a circumferential direction of the stator core.

15. The traction motor of claim 13, wherein for each winding unit, all turns of the first coil with the same pitch are wound on a group of teeth and all turns of the second coil with the same pitch are wound on another group of teeth.

16. The traction motor of claim 13, wherein for each winding unit, the center of the first coil overlaps with the center of the second coil in a radial direction of the stator, the first coil spans over all teeth on which the second coil are wound.

17. The traction motor of claim 15, wherein the first coil has a greater number of turns compared with the second coil.

18. The traction motor of claim 1, wherein each of the rotor poles is formed by two pieces of magnet, which form a "V" in a cross section of the rotor core, and the "V" is substantially bisected by a radius of the rotor core.

19. The traction motor of claim 1, wherein a bridge gap is disposed between adjacent ends of the two pieces of magnet.

* * * * *